G. MAZZEO & P. IARUSSI.
VEHICLE WHEEL.
APPLICATION FILED FEB. 11, 1911.

1,011,469.

Patented Dec. 12, 1911.
3 SHEETS—SHEET 3.

WITNESSES:

INVENTORS:
Gabriel Mazzeo and
Pasquale Iarussi,
BY
Fraentzel and Richards,
ATTORNEYS

UNITED STATES PATENT OFFICE.

GABRIEL MAZZEO AND PASQUALE IARUSSI, OF NEWARK, NEW JERSEY.

VEHICLE-WHEEL.

1,011,469.  Specification of Letters Patent.  Patented Dec. 12, 1911.

Application filed February 11, 1911. Serial No. 607,912.

*To all whom it may concern:*

Be it known that we, GABRIEL MAZZEO and PASQUALE IARUSSI, citizens of the United States, residing at Newark, in the county of Essex and State of New Jersey, have invented certain new and useful Improvements in Vehicle-Wheels; and we do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, generally, to improvements in resilient tires for vehicle wheels, with reference, more particularly, to the adaptability of the resilient tire to the wheels of automobiles and vehicles of a similar character; and, the invention relates, more especially, to a novel construction of tire, the resilient properties of which are due to its mechanical construction, rather than to the employment of pneumatic principles, yet providing a tire of desirable elasticity or resiliency in its tread.

The present invention, therefore, has for its principal object to provide a novel construction of resilient vehicle-tire of purely mechanical construction and operation in producing the resilient effects.

A further object of the present invention is to provide a simple, durable, strong and efficient construction of mechanically resilient vehicle tire.

Other objects of the present invention not at this time more particularly enumerated will be clearly understood from the following detailed description of our present invention.

With the various objects of the present invention in view, the said invention consists, primarily, in the novel mechanical resilient tire for the wheels of vehicles hereinafter set forth; and, the invention consists, furthermore, in the novel arrangements and combinations of the several devices and parts, as well as in the details of the construction of the same, all of which will be more fully described in the following specification, and then finally embodied in the clauses of the claim which are appended to and which form an essential part of this specification.

The invention is clearly illustrated in the accompanying drawings, in which:—

Figure 1:
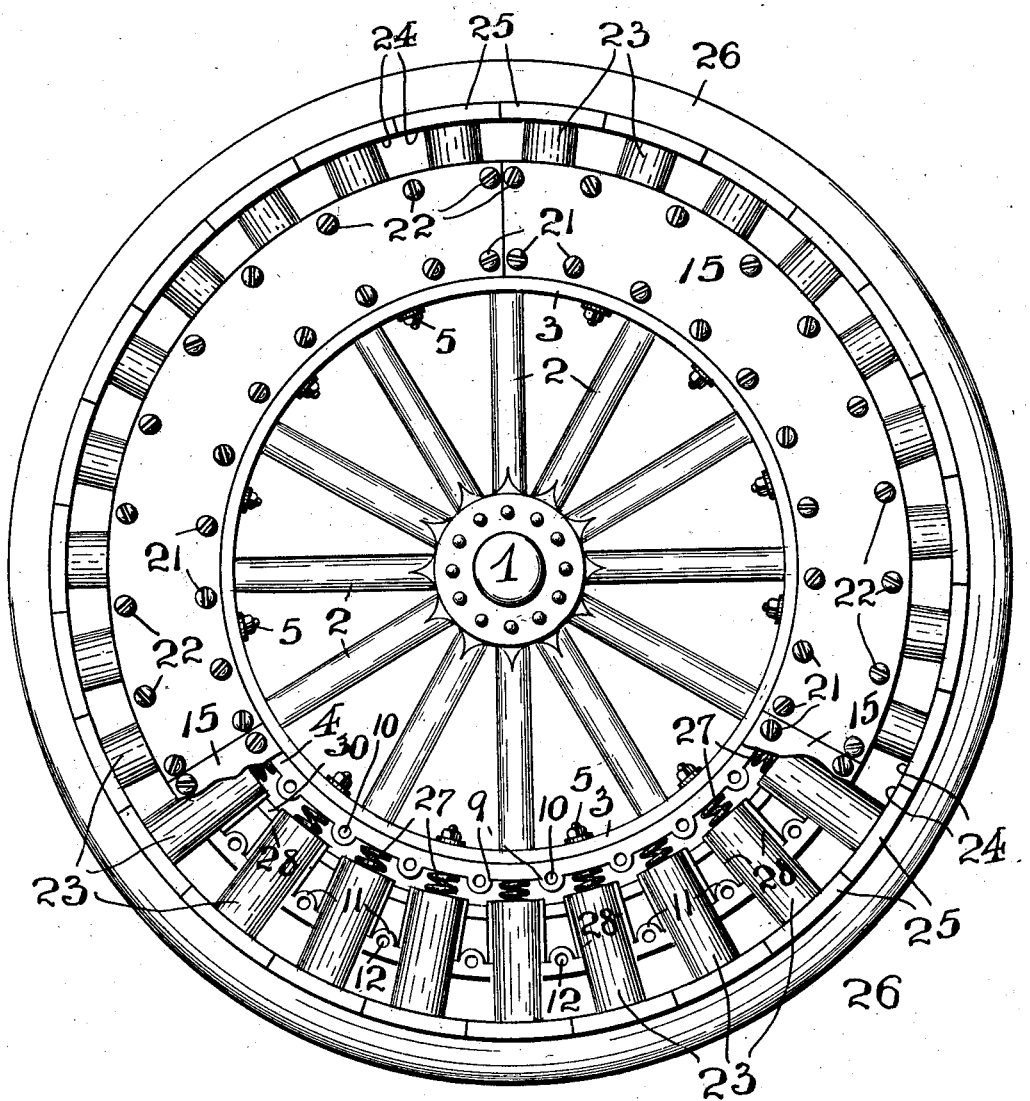
Figure 2:
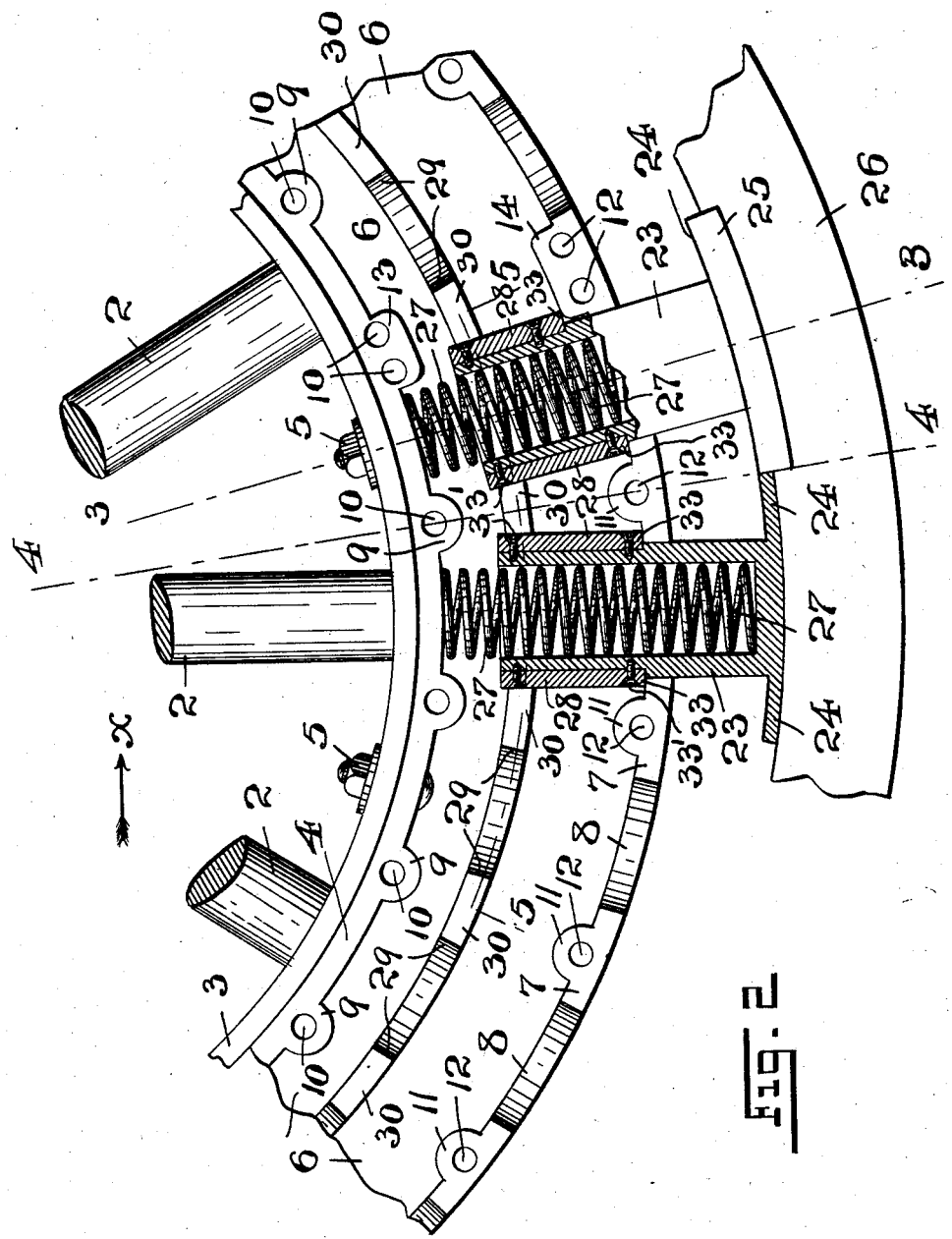
Figure 3:
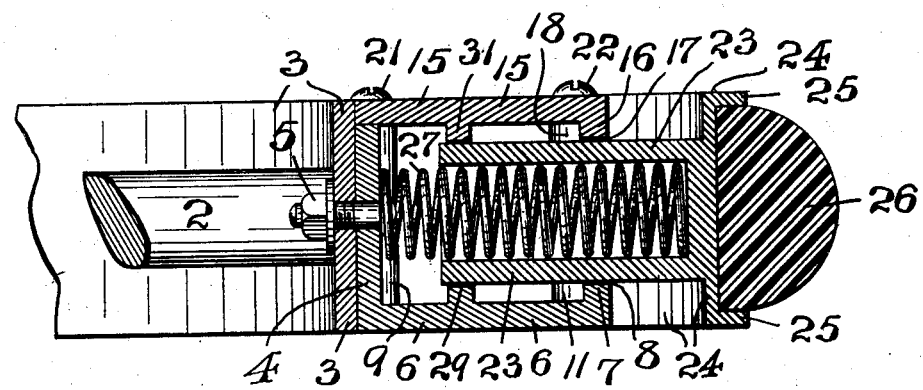
Figure 4:
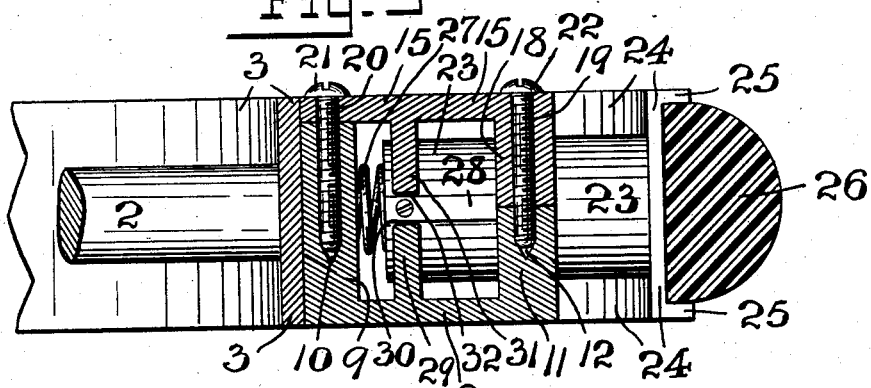
Figure 5:
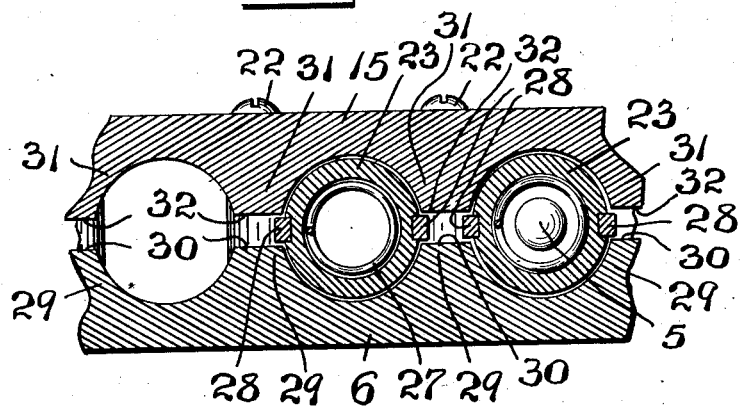

Figure 1 is a side elevation of a vehicle-wheel equipped with the novel construction of resilient-tire, a portion of one of its removable side-plates being shown removed to clearly illustrate the arrangement and construction of certain of the interior parts of the tire. Fig. 2 is a large detail section, taken longitudinally of the tread of said tire, and illustrating the internal construction and arrangement of the same. Fig. 3 is a detail vertical cross-section, taken on line 3—3 in said Fig. 2, looking in the direction of the arrow $x$—$x$; Fig. 4 is another detail vertical cross-section, taken on line 4—4 in said Fig. 2; and Fig. 5 is a detail horizontal section, taken on line 5—5 in said Fig. 2.

Similar characters of reference are employed in all of the herein-above described views, to indicate corresponding parts.

Referring now to the several figures of the said drawings, the reference-character 1 indicates the hub of a vehicle-wheel from which radiate, in the usual manner, the rim or felly-supporting spokes 2, the free ends of which are connected with a rim or felly 3. Arranged upon the outer circumferential surface of said rim or felly 3 is a construction of tire, showing one embodiment of the principles of the present invention, the same comprising a casing formed with a base-portion 4 which is secured to said rim or felly 3 by means of suitable bolts and nuts 5, or any other desirable fastening means. Integrally connected with said base-portion 4 is a side-plate 6, which extends outwardly at right angles thereto from one marginal edge of said base-portion 4. Integrally connected with the lower marginal edge of said side-plate 6 is an inwardly extending bottom-flange 7, the same being provided at suitable intervals with semi-circular cutaway portions 8. Said base-portion 4 is provided with a plurality of transversely extending ribs 9, the same being provided with screw-threaded openings 10, and in like manner, said bottom-flange 7 is also provided, on its inner side, with a plurality of transversely extending ribs 11 also provided with screw-threaded openings 12. At suitable intervals both said base-portion 4 and said bottom-flange 7 are each provided with transversely extending double ribs 13 and 14 respectively, the same being each provided with two of said screw-threaded openings 10 and 12, respectively.

The reference-character 15 indicates a series of side-plate sections, the same being provided at their bottom edges with bottom-flanges 16 which are provided with semi-circular cut-out portions 17, arranged at suitable intervals. In like manner said bottom flange is provided on its inner side with transversely extending ribs 18, the same having openings 19 extending therethrough. The upper marginal edge-portion of said side-plate sections 15 are also provided with suitably disposed openings 20. Said side-plate sections are adapted to be connected with said base-portion 4 to complete the casing. To this end said side-plate sections are arranged so that their openings 20 will register with said screw-threaded openings 10 of said transverse ribs 9 of said base-portion 4 and the screws 21 being inserted are screwed home to bind said parts together. As so arranged the bottom-flange 16 of said side-plate-sections 15 are in registration with the bottom flange 7 of said side-plate 6, so that screws 22 may be passed through the openings 19 of the ribs 18 of the former and screwed into the screw-threaded opening 12 of the latter. It will also be understood that when said respective bottom-flanges 7 and 16 are secured together the respective semi-circular cut-away portions 8 of the former registering with said semi-circular cut-away portions 17 of the latter provide circular openings or bearings in which are slidably supported the tubular stems 23 of tread-rims 24. Said tread-rims 24 are provided with side flanges 25 by means of which there is retained seated thereupon a portion of a continuous shoe 26, preferably made of some resilient material, such as rubber or other desirable material. Said tubular stems 23 are carried by said casing so as to radiate from the wheel-center, and said tread-rims 24 connected with said stems provide a continuous seat for said shoe 26, since the same are arranged end to end entirely around the circumference of the wheel. Each tread-rim 24, however, is a separate and independent member capable of a greater or less movement independently of the movement of its fellows. Said tubular stems 23 of said tread-rims 24 pass into said casing, and a coil-spring 27 is arranged in the interior of each tubular stem, the outwardly projecting end of said coil-spring bearing upon the inner side of said base-portion 4 of said casing. The said coil-springs serve to provide each tread-rim 24 with an independent resiliency. In order to prevent said tread-rims 24 and their respective tubular stems 23 from swiveling or turning, and thereby permitting said tread-rims 24 to become out of their proper relative alinement one with the other to properly support said shoe 26, the following means is provided. Secured upon opposite sides of each tubular stem 23, by means of screws $33^1$, or in any desirable manner, are longitudinally extending ribs or guides 28. Arranged upon the interior sides of said side-plate 6 are a plurality of inwardly projecting lugs 29, the free ends 30 of which are arranged to engage said ribs or guides 28 on one side. In like manner, each of said side-plate sections 15 are also provided upon their inner sides with upwardly projecting lugs 31, the free ends 32 of which are arranged to engage said ribs or guides 28 on their opposite sides. Thus, while said tubular stems 23 are permitted to have a vertical sliding movement within said casing, they cannot twist or turn therein, and consequently said tread-rims 24 are maintained in constant alinement one with the other to provide a continuous guiding seat for said shoe 26. Said ribs or guides 28 are further arranged that their lower ends 33 provide stops, which, engaging with the marginal edges of said cutaway portions 8 and 17 of said respective bottom flanges 7 and 16, limit the downward or outward movement of said tread-rims 24, thereby causing the same to normally form a perfect circumference concentric to the wheel center, and thus properly supporting said shoe 26 without undue strains or pressures upon the latter. In operation the said shoe 26 provides a continuous or unbroken tread which yields to direct pressures, or to the unevenness of the road-surface very easily and quickly, due to the resilient mounting of the tread-rim sections upon their independent springs 27, all in a manner clearly to be understood from the above description and an inspection of the several figures of the drawings.

We are aware that some changes may be made in the arrangements and combinations of the various devices and parts, as well as in the details of the construction of the same, without departing from the scope of our present invention as described in the foregoing specification, and as defined in the claims which are appended thereto. Hence, we do not limit our invention to the exact arrangements and combinations of the devices and parts as set forth in the said specification, nor do we confine ourselves to the exact details of the construction of the said parts, as illustrated in the accompanying drawings.

We claim:—

1. A resilient tire for vehicles, comprising a casing, a plurality of tread-rims supported in continuous alinement exteriorly of said casing, tubular stems connected with said tread-rims, said tubular stems being adapted to penetrate within said casing, ribs or guides secured on opposite sides of each tubular stem, inwardly projecting lugs upon the interior side-portions of said casing, the free ends of which engage said ribs or guides to prevent said tubular-stems from turning and said tread-rims from being moved out of their continuous alinement, coil-springs arranged within said casing and seated in each tubular stem to provide each tread-rim with an independent vertical and resilient movement, and a continuous shoe supported or carried by said tread-rims.

2. A resilient tire for vehicles, comprising a casing, said casing being formed with a base-portion, a side-plate having a bottom-flange, a series of side-plate sections also provided with bottom flanges adapted to register with said bottom flange of said first-mentioned side-plate, means for fastening said side-plate sections in their proper relation in said casing, a plurality of tread rims supported in continuous alinement exteriorly of said casing, tubular stems connected with said tread-rims, said bottom flanges of said casing being provided with cut-away portions adapted to form openings to permit said tubular stems to penetrate within said casing, ribs or guides secured on opposite sides of each tubular stem, inwardly projecting lugs on said side-plate and inwardly projecting lugs on said side-plate sections arranged in the interior of said casing and coöperating with said ribs or guides on said tubular-stems to prevent the same from turning and said tread-rims from being moved out of their continuous alinement, coil-springs arranged within said casing and seated in each tubular stem to provide each tread-rim with an independent vertical and resilient movement, and a continuous shoe supported or carried by said tread-rims.

In testimony that we claim the invention set forth above we have hereunto set our hands this 10th day of February, 1911.

GABRIEL MAZZEO.
PASQUALE IARUSSI.

Witnesses:
FREDK. C. FRAENTZEL,
FREDK. H. W. FRAENTZEL.

---

Copies of this patent may be obtained for five cents each, by addressing the "Commissioner of Patents, Washington, D. C."